United States Patent
Chang et al.

(10) Patent No.: US 9,146,649 B1
(45) Date of Patent: Sep. 29, 2015

(54) PASSIVE TOUCH PEN

(71) Applicant: Primax Electronics Ltd., Taipei (TW)

(72) Inventors: A-Ming Chang, Taipei (TW); Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/452,026

(22) Filed: Aug. 5, 2014

(30) Foreign Application Priority Data

May 14, 2014 (CN) .......................... 2014 2 0244991

(51) Int. Cl.
*G06F 3/044* (2006.01)
*G06F 3/0354* (2013.01)
*G06F 3/033* (2013.01)
*G06F 3/03* (2006.01)

(52) U.S. Cl.
CPC ................ *G06F 3/044* (2013.01); *G06F 3/033* (2013.01); *G06F 3/03545* (2013.01); *G06F 3/03* (2013.01)

(58) Field of Classification Search
CPC ............ G06F 3/044; G06F 3/033; G06F 3/03
USPC .......................................... 345/179, 174, 175
See application file for complete search history.

(56) References Cited

U.S. PATENT DOCUMENTS

| | | | |
|---|---|---|---|
| 2011/0169775 A1* | 7/2011 | Liaw et al. ..................... | 345/175 |
| 2011/0304577 A1* | 12/2011 | Brown et al. ................. | 345/174 |
| 2011/0316815 A1* | 12/2011 | Fang ............................. | 345/179 |
| 2012/0086674 A1* | 4/2012 | Kim et al. ..................... | 345/179 |
| 2012/0139879 A1* | 6/2012 | Kim et al. ..................... | 345/179 |
| 2012/0162155 A1* | 6/2012 | Jiang et al. .................... | 345/179 |
| 2013/0076701 A1* | 3/2013 | Wu ................................ | 345/179 |
| 2013/0100086 A1* | 4/2013 | Kim .............................. | 345/179 |
| 2013/0300720 A1* | 11/2013 | Hung ............................ | 345/179 |
| 2014/0085248 A1* | 3/2014 | Wang ............................ | 345/174 |
| 2014/0176495 A1* | 6/2014 | Vlasov ......................... | 345/174 |
| 2015/0022487 A1* | 1/2015 | Kuo .............................. | 345/174 |

* cited by examiner

*Primary Examiner* — Fred Tzeng
(74) *Attorney, Agent, or Firm* — Kirton McConkie; Evan R. Witt

(57) ABSTRACT

A passive touch pen for a capacitive touch screen is provided. The passive touch pen includes a pen tube, a fixing post, and a conductive rubber tip. The pen tube has a vent. The fixing post is disposed within the pen tube, and includes a first perforation and a second perforation. The first perforation is open to a top surface of the fixing post. The second perforation is open to a lateral surface of the fixing post. The conductive rubber tip is sheathed around the fixing post and exposed outside the pen tube. After the conductive rubber tip is no longer compressed, air can be quickly introduced into to a vacant space between the conductive rubber tip and the top surface of the fixing post through the vent, the second perforation and the first perforation. Consequently, the conductive rubber tip is restored to an original non-compressed shape.

13 Claims, 7 Drawing Sheets

PASSIVE TOUCH PEN

FIELD OF THE INVENTION

The present invention relates to a touch pen, and more particularly to a passive touch pen for a capacitive touch screen.

BACKGROUND OF THE INVENTION

Nowadays, the commercially available touch screens are classified into several types, including a resistive touch screen, an acoustic wave touch screen, an infrared touch screen and a capacitive touch screen. When an external force is exerted on the resistive touch screen, a voltage is generated and a command is recognized according to the voltage. Moreover, acoustic waves or infrared rays pass over the surface of the acoustic wave touch screen or the infrared touch screen. By touching the surface of the acoustic wave touch screen or the infrared touch screen, the travelling path of the acoustic wave or the infrared ray is blocked and thus the corresponding command is recognized. When the human body is contacted with the capacitive touch screen, the capacitance value of the touch point of the capacitive touch screen is subjected to a change. According to the change of the capacitance value, the touch position is recognized. In views of the touch accuracy and the fabricating cost, the capacitive touch screen is widely adopted.

For complying with the utilized function of the capacitive touch screen, a capacitive touch pen is introduced into the market. Generally, the capacitive touch pen is used for tapping or selecting the capacitive touch screen. In addition, the capacitive touch pen may also have the handwriting and drawing functions. In accordance with the current technology, the capacitive touch pens are classified into two types, i.e. active touch pens and passive touch pens. The passive touch pen has a contact tip made of a conductive rubber. Moreover, the conductive rubber tip is combined with a metallic pen tube. When the conductive rubber tip touches the capacitive touch screen, the electric energy of the human body is transmitted to the conductive rubber tip through the metallic pen tube. Consequently, the capacitance value of the touch point between the capacitive touch screen and the conductive rubber tip is changed.

Hereinafter, the structure of a conventional passive touch pen will be illustrated with reference to FIG. 1. FIG. 1 is a schematic cross-sectional view illustrating a conventional passive touch pen. As shown in FIG. 1, the conventional passive touch pen 1 comprises a pen barrel 10, a conductive rubber tip 11, a coupling ring 12, a positioning screw 13, a supporting seat 14, and a rubber tip supporting member 15. The rubber tip supporting member 15 comprises a supporting ring 151 and a center post 152.

The coupling ring 12 is arranged between the pen barrel 10 and the conductive rubber tip 11. From top to bottom, the components within the coupling ring 12 and the conductive rubber tip 11 comprise the positioning screw 13, the supporting seat 14 and the rubber tip supporting member 15. Moreover, the conductive rubber tip 11 comprises a radial part 111. The radial part 111 of the conductive rubber tip 11 is positioned in the region between a lower stepped part 121 of the coupling ring 12 and a protruded edge 141 of the supporting seat 14.

The rubber tip supporting member 15 is combined with the supporting seat 14. Moreover, the rubber tip supporting member 15 is located at an inner and rear side (i.e. the upper side as shown in FIG. 1) of an arc-shaped end of the conductive rubber tip 11. A first end of the rubber tip supporting member 15 has a center opening, and a distal post 142 of the supporting seat 14 is inserted into the center opening. The supporting ring 151 and the center post 152 are located at a second end (i.e. the lower end as shown in FIG. 1) of the rubber tip supporting member 15. In other words, the supporting ring 151 and the center post 152 are located at the inner and rear side (i.e. the upper side as shown in FIG. 1) of the arc-shaped end of the conductive rubber tip 11.

The positioning screw 13 is penetrated through a center hole of the coupling ring 12 and tightened into a center screw hole of the supporting seat 14. Consequently, the conductive rubber tip 11, the supporting seat 14 and the rubber tip supporting member 15 are assembled with the coupling ring 12 and positioned on the coupling ring 12. Next, an outer screw thread 101 of the pen barrel 10 and an inner screw thread 122 of the coupling ring 12 are engaged with each other. Meanwhile, the passive touch pen 1 is assembled.

After the assembling process of the passive touch pen 1 is completed, the user may touch or slide the conductive rubber tip 11 on the capacitive touch screen. In response to the counterforce provided by the capacitive touch screen, a portion of the conductive rubber tip 11 is subjected to deformation so as to press the supporting ring 151 and the center post 152 of the rubber tip supporting member 15. That is, in response to the counterforce, the supporting ring 151 and the center post 152 are gradually compressed. Consequently, the rubber tip supporting member 15 may provide a resilient restoring force. In response to the resilient restoring force, the conductive rubber tip 11 can be restored to its original shape while maintaining the functions thereof.

However, the conventional passive touch pen 1 still has some drawbacks. For example, the use of the rubber tip supporting member 15 may increase the fabricating cost and the structural complexity of the passive touch pen 1. Therefore, it is an important issue to provide an improved passive touch pen without the rubber tip supporting member 15. Moreover, the conductive rubber tip of the improved passive touch pen can be automatically restored to the non-compressed original shape when the conductive rubber tip is no longer compressed.

SUMMARY OF THE INVENTION

An object of the present invention provides a passive touch pen with a venting structure in order to reduce the fabricating cost and the structural complexity.

In accordance with an aspect of the present invention, there is provided a passive touch pen for a capacitive touch screen. The passive touch pen includes a pen tube, a fixing post, and a conductive rubber tip. The pen tube includes a vent. The fixing post is located at a front end of the pen tube, and includes a first perforation and a second perforation. The first perforation is open to a top surface of the fixing post. The second perforation is open to a lateral surface of the fixing post. The conductive rubber tip is sheathed around the fixing post and exposed outside the front end of the pen tube. There is a vacant space between the conductive rubber tip and the top surface of the fixing post. When the conductive rubber tip is compressed, air within the vacant space is discharged out of the vacant space. When the conductive rubber tip is no longer compressed, air is introduced into to the vacant space through the vent, the second perforation and the first perforation, so that the conductive rubber tip is restored to an original non-compressed shape.

In accordance with another aspect of the present invention, there is provided a passive touch pen for a capacitive touch screen. The passive touch pen includes a pen tube, a fixing post, and a conductive rubber tip. The pen tube includes a vent. The fixing post is located at a front end of the pen tube, and includes a recess. The recess is formed in a lateral surface of the fixing post. The conductive rubber tip is sheathed around the fixing post and exposed outside the front end of the pen tube. The fixing post is sheltered by an inner surface of the conductive rubber tip, but no complementary structure matching the elongated recess is formed on the inner surface of the conductive rubber tip. There is a vacant space between the conductive rubber tip and the top surface of the fixing post. When the conductive rubber tip is compressed, air within the vacant space is discharged out of the vacant space. When the conductive rubber tip is no longer compressed, air is introduced into to the vacant space through the vent and the recess, so that the conductive rubber tip is restored to an original non-compressed shape.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
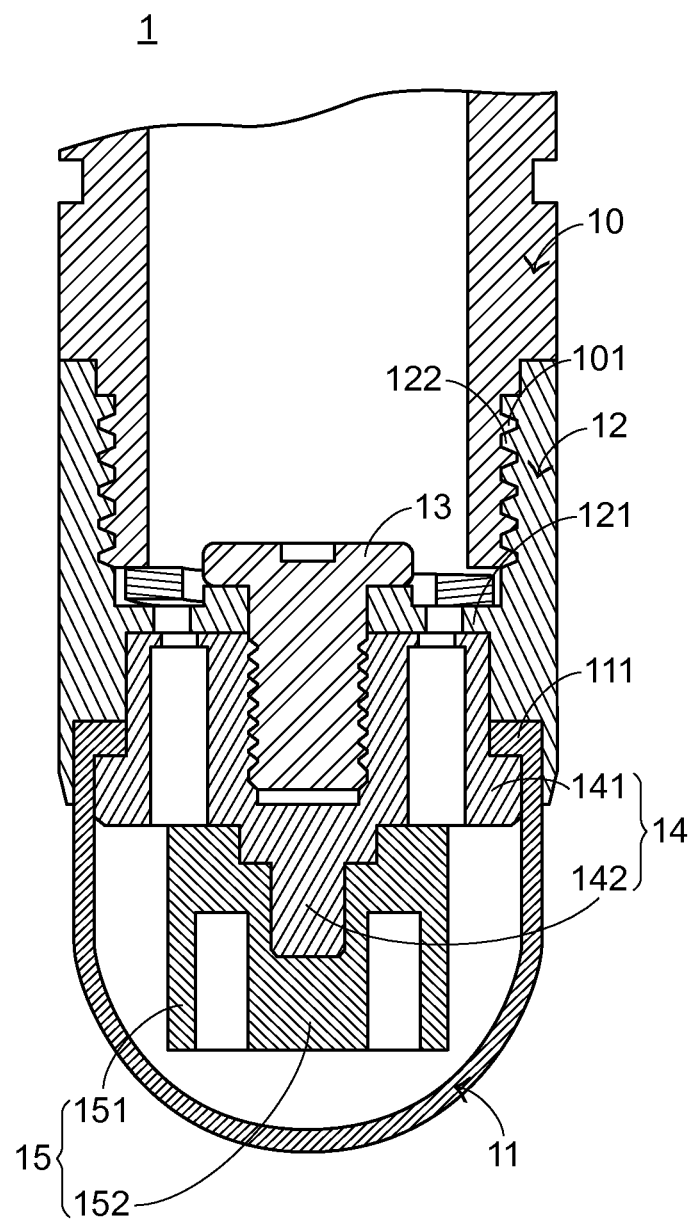
FIG. 1 is a schematic cross-sectional view illustrating a conventional passive touch pen.
Figure 2:
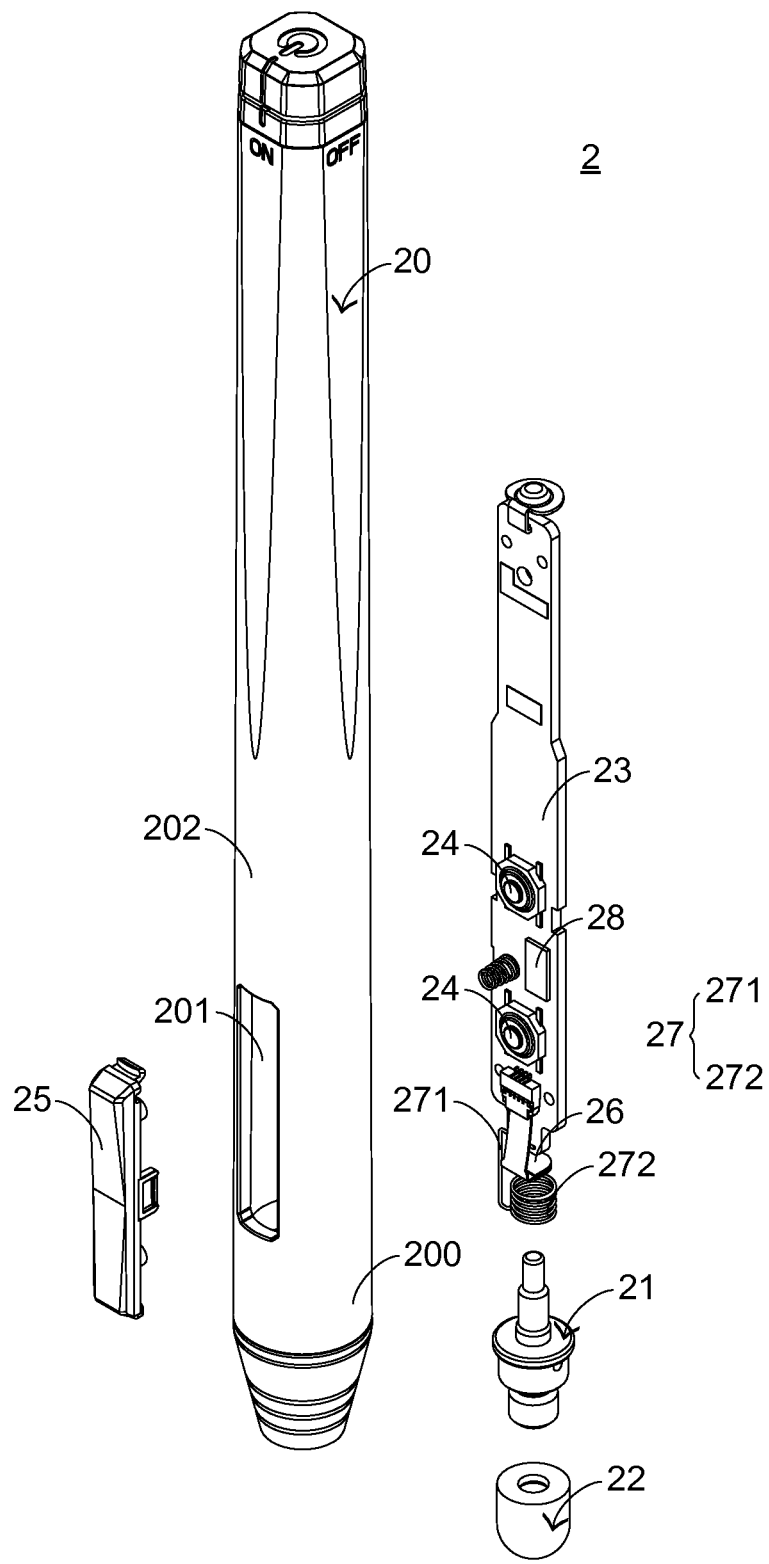
FIG. 2 is a schematic exploded view illustrating a passive touch pen according to a first embodiment of the present invention.
Figure 3:
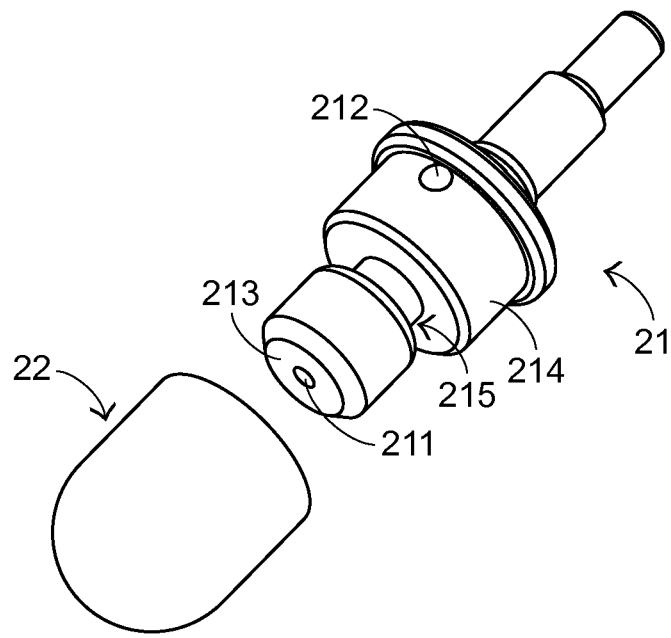
FIG. 3 is a schematic exploded view illustrating a fixing post and a conductive rubber tip of the passive touch pen of FIG. 2.
Figure 4:
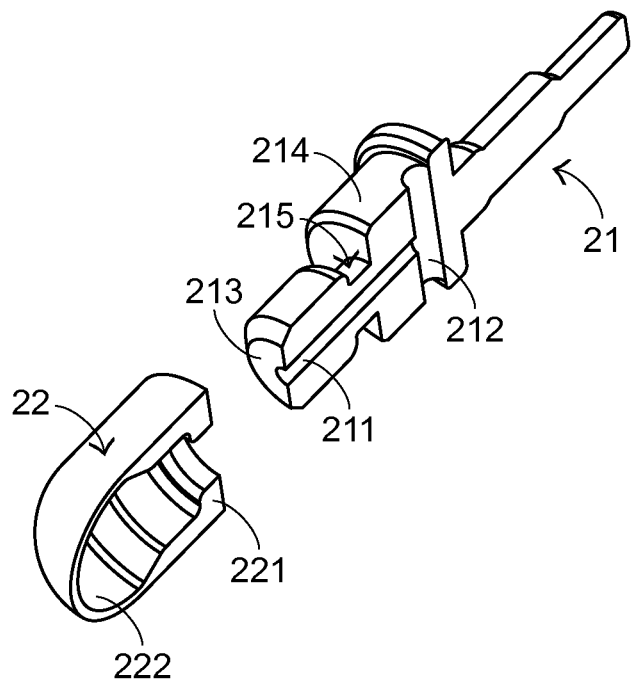
FIG. 4 is a schematic cutaway view illustrating the fixing post and the conductive rubber tip of the passive touch pen of FIG. 3.
Figure 5:
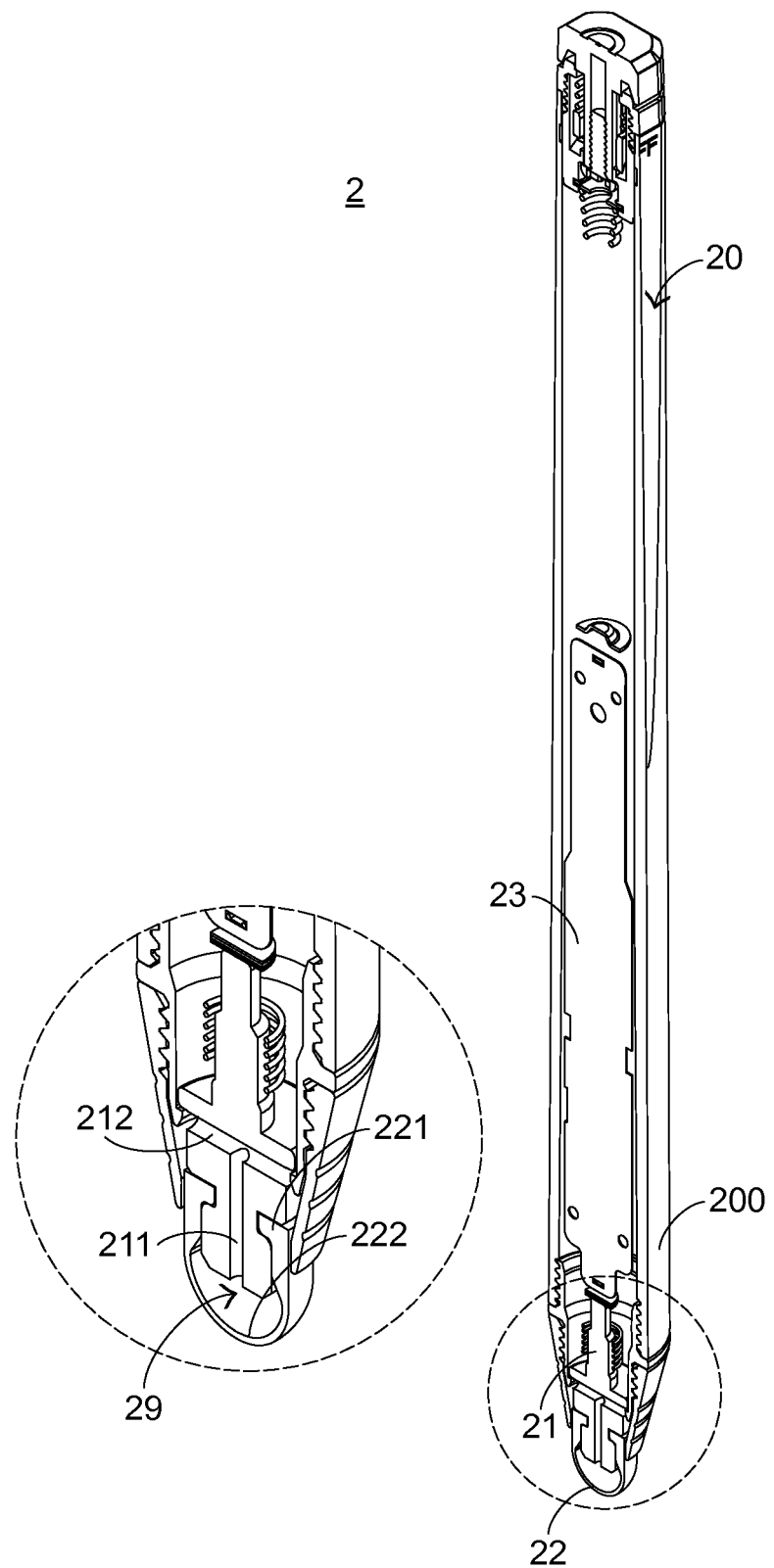
FIG. 5 is a schematic cutaway view illustrating the passive touch pen according to the first embodiment of the present invention.

Hereinafter, a passive touch pen 2 according to a first embodiment of the present invention will be illustrated with reference to FIGS. 2~5. FIG. 2 is a schematic exploded view illustrating a passive touch pen according to a first embodiment of the present invention. FIG. 3 is a schematic exploded view illustrating a fixing post and a conductive rubber tip of the passive touch pen of FIG. 2. FIG. 4 is a schematic cutaway view illustrating the fixing post and the conductive rubber tip of the passive touch pen of FIG. 3. FIG. 5 is a schematic cutaway view illustrating the passive touch pen according to the first embodiment of the present invention.

The components of the passive touch pen 2 and the assembling sequence thereof will be illustrated as follows. As shown in FIG. 2, the passive touch pen 2 comprises a pen tube 20, a fixing post 21, a conductive rubber tip 22, a circuit board 23, two switch elements 24, a plastic pressing element 25, a pressure sensor 26, a conductive elastic element 27, and a wireless transmission module 28. By grasping the pen tube 20, the user may operate the conductive rubber tip 22 to control a capacitive touch screen (not shown), which will be illustrated as follows.

In this embodiment, the pen tube 20 is made of a conductive material (e.g. a metallic material), and the fixing post 21 is made of a metallic material or a conductive plastic material. It is noted that the materials of these components are not restricted.

Please refer to FIGS. 2 and 5. For assembling the passive touch pen 2, the circuit board 23 is disposed within the pen tube 20, the two switch elements 24 and the wireless transmission module 28 are disposed on the circuit board 23, and the pressure sensor 26 and an end 271 of the conductive elastic element 27 are connected with a bottom edge (i.e. a bottom side as shown in FIG. 2) of the circuit board 23. The fixing post 21 is located at a front end 200 of the pen tube 20, and contacted with the pen tube 20. Moreover, a helical part 272 of the conductive spring 27 is sheathed around the fixing post 21, and the conductive rubber tip 22 is sheathed around the fixing post 21 and exposed outside the front end 200 of the pen tube 20.

Moreover, as shown in FIG. 2, the pen tube 20 comprises a vent 201. The vent 201 is located at a lateral side 202 of the pen tube 20. The two switch elements 24 and the wireless transmission module 28 are aligned with the vent 201. The pressing element 25 is disposed within the vent 201. Moreover, the pressing element 25 is movable relative to vent 201 in order to selectively trigger the two switch elements 24. Since the pen tube 20 is made of the conductive material, the wireless transmission module 28 is possibly influenced by the pen tube 20. More especially, since the wireless transmission module 28 is aligned with the vent 201 and the plastic pressing element 25, the interference affecting the wireless transmission module 28 will be minimized.

Moreover, as shown in FIG. 3, the fixing post 21 comprises a first perforation 211 and a second perforation 212. The first perforation 211 is open to a top surface 213 of the fixing post 21. The second perforation 212 is open to a lateral surface 214 of the fixing post 21. Moreover, as shown in FIG. 4, the second perforation 212 runs through the lateral surface 214 of the fixing post 21. The first perforation 211 is in communication with the top surface 213 of the fixing post 21 and the second perforation 212. In other words, the first perforation 211 and the second perforation 212 are collaboratively defined as a T-shaped venting channel.

After the above assembling process is completed, the user may grasp the pen tube 20 and allow the conductive rubber tip 22 to press the capacitive touch screen (not shown). Consequently, the electric energy of the human body is transmitted to the conductive rubber tip 22 through the pen tube 20 and the fixing post 21. Consequently, a coupling capacitance between the conductive rubber tip 22 and the capacitive touch screen is generated. According to the coupling capacitance, a position of the touch point between the conductive rubber tip 22 and the capacitive touch screen may be calculated by a controller (not shown) of the capacitive touch screen.

Please refer to FIGS. 4 and 5. A protruded ring 221 of the conductive rubber tip 22 is locked into a neck part 215 of the fixing post 21. Consequently, the conductive rubber tip 22 is fixed on the fixing post 21. The shape of the protruded ring 221 matches the shape of the neck part 215. Consequently, there is only a tiny seam between the protruded ring 221 and the neck part 215. Moreover, there is a vacant space 29 between an inner surface 222 of the conductive rubber tip 22 and the top surface 213 of the fixing post 21.

When the capacitive touch screen is pressed by the conductive rubber tip 22 and the conductive rubber tip 22 is compressed in the direction toward the fixing post 21, the air within the vacant space 29 is discharged to the outside of the vacant space 29 through the seam between the protruded ring 221 and the neck part 215, the first perforation 211 and the second perforation 212.

When the capacitive touch screen is no longer pressed by the conductive rubber tip 22, the air cannot be quickly introduced into to the vacant space 29 through the seam between the protruded ring 221 and the neck part 215, but the air can be quickly introduced into to the vacant space 29 through the vent 201 of the pen tube 20, the second perforation 212 and the first perforation 211. Consequently, the conductive rubber tip 22 is restored to its original non-compressed shape. In this embodiment, the passive touch pen 2 is not equipped with the rubber tip supporting member 15 of the conventional passive touch pen 1. Consequently, the fabricating cost and the structural complexity are both reduced.

Moreover, when the conductive rubber tip 22 is compressed, the extent of pushing the fixing post 21 to press the pressure sensor 26 is detected by the pressure sensor 26 of the passive touch pen 2. Consequently, the compressed force that is exerted on the conductive rubber tip 22 can be realized. Then, a control signal corresponding to the compressed force exerted on the conductive rubber tip 22 is transmitted the capacitive touch screen through the wireless transmission module 28. According to the control signal, the thickness of the line shown on the capacitive touch screen is correspondingly changed. Moreover, by the conductive elastic element 27, the solid fixing post 21 is returned to the original position.

It is noted that numerous modifications and alterations may be made while retaining the teachings of the invention. For example, in some other embodiments, the circuit board 23, the two switch elements 24, the plastic pressing element 25, the pressure sensor 26, the conductive elastic element 27 and the wireless transmission module 28 may be omitted.

Figure 6:
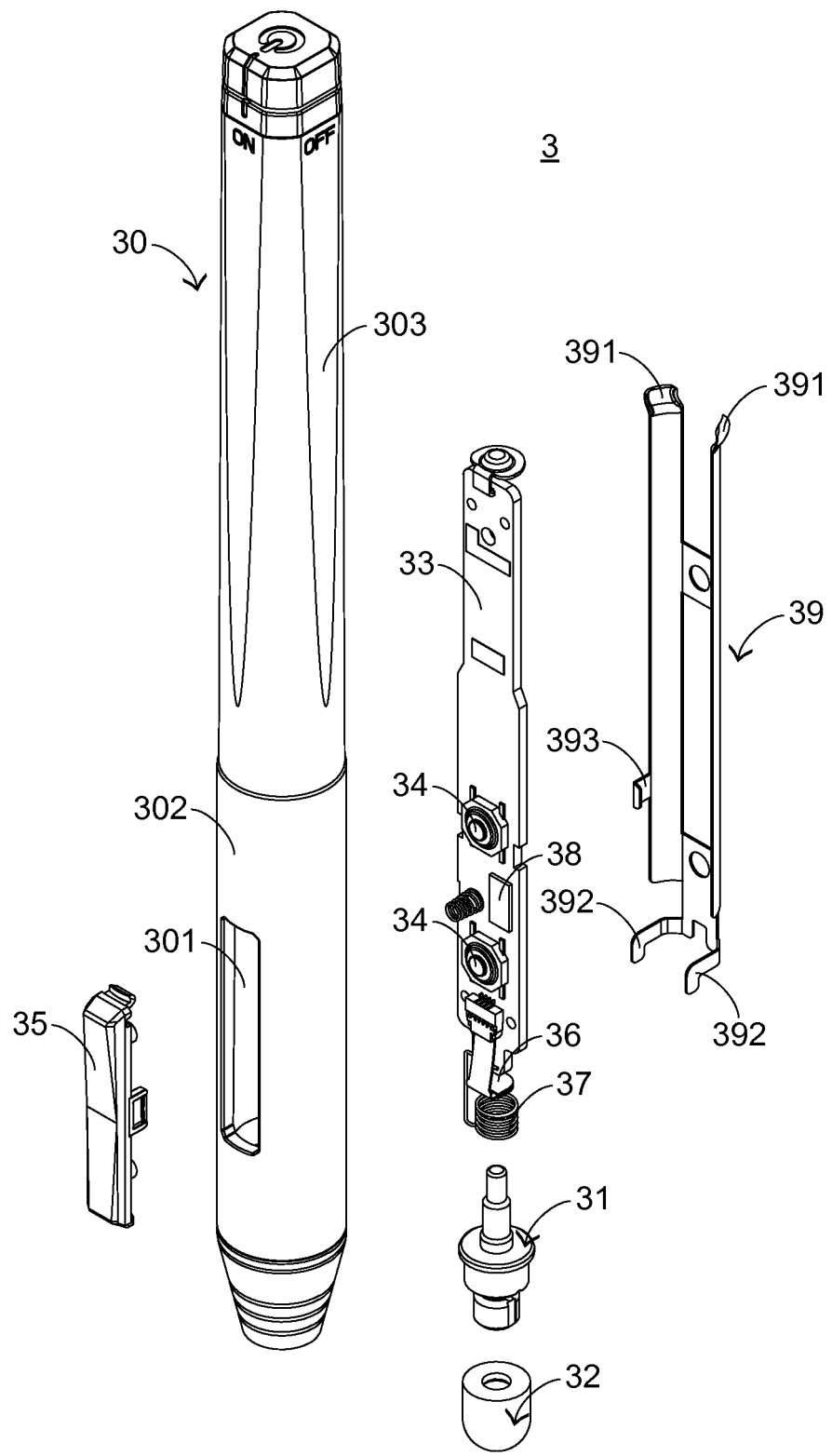
FIG. 6 is a schematic exploded view illustrating a passive touch pen according to a second embodiment of the present invention.
Figure 7:
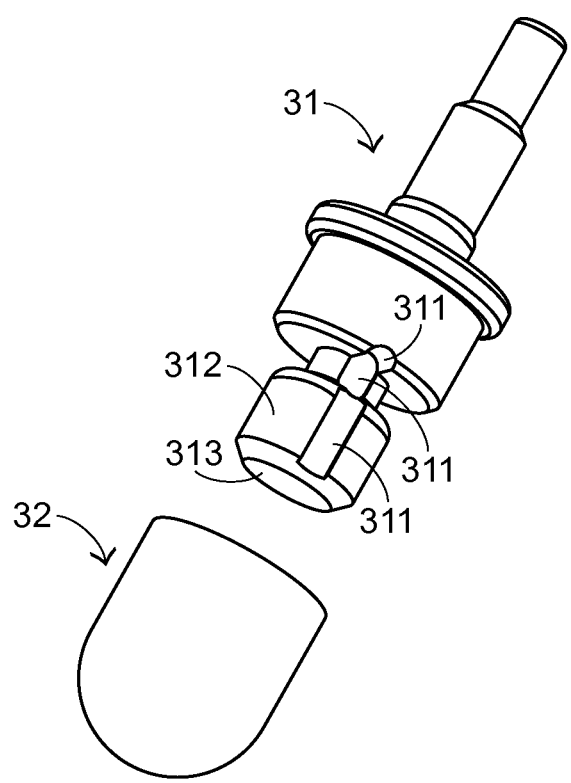
FIG. 7 is a schematic cutaway view illustrating a fixing post and a conductive rubber tip of the passive touch pen of FIG. 6.
Figure 8:
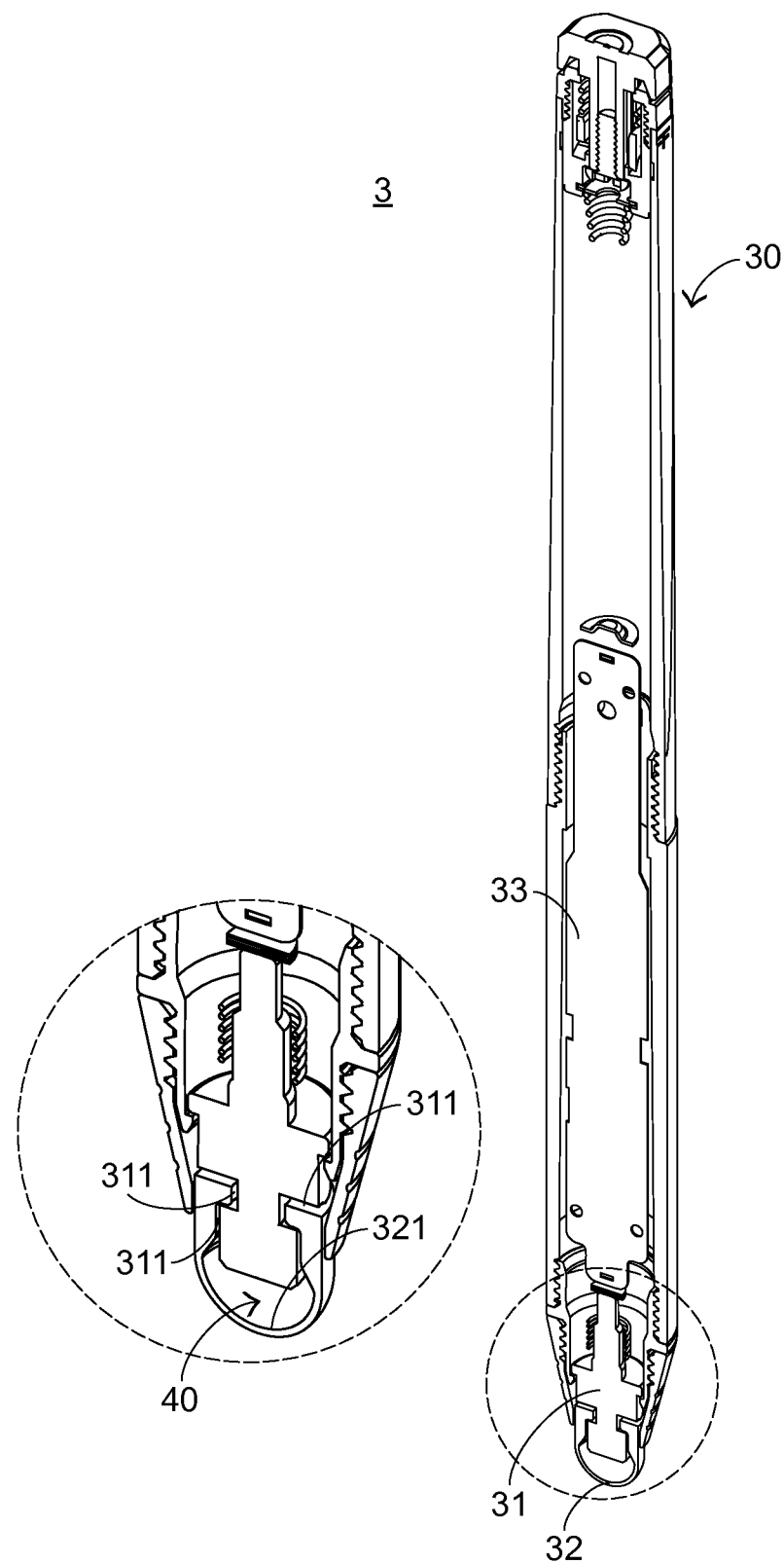
FIG. 8 is a schematic cutaway view illustrating the passive touch pen according to the second embodiment of the present invention.

Hereinafter, a passive touch pen 3 according to a second embodiment of the present invention will be illustrated with reference to FIGS. 6~8. FIG. 6 is a schematic exploded view illustrating a passive touch pen according to a second embodiment of the present invention. FIG. 7 is a schematic cutaway view illustrating a fixing post and a conductive rubber tip of the passive touch pen of FIG. 6. FIG. 8 is a schematic cutaway view illustrating the passive touch pen according to the second embodiment of the present invention.

The components of the passive touch pen 3 and the assembling sequence thereof will be illustrated as follows. As shown in FIG. 6, the passive touch pen 3 comprises a pen tube 30, a fixing post 31, a conductive rubber tip 32, a circuit board 33, two switch elements 34, a plastic pressing element 35, a pressure sensor 36, a conductive elastic element 37, a wireless transmission module 38, and a conductive plate 39.

Except for the following two aspects, the components and functions of the passive touch pen 3 are substantially identical to those of the passive touch pen 2 of the first embodiment. The identical aspects will not be redundantly described herein. Hereinafter, only the two different aspects will be illustrated.

Please refer to FIGS. 7 and 8. In accordance with a first distinguished aspect, the fixing post 31 has an elongated recess 311. The elongated recess 311 is formed in a lateral surface 312 of the fixing post 31. The length of the elongated recess 311 substantially covers the length of the junction between the conductive rubber tip 32 and the fixing post 31.

After the conductive rubber tip 32 and the fixing post 31 are combined together, the fixing post 31 is sheltered by an inner surface 321 of the conductive rubber tip 32. However, no complementary structure matching the elongated recess 311 is formed on the inner surface 321 of the conductive rubber tip 32. In other words, the inner surface 321 of the conductive rubber tip 32 is not embedded within the elongated recess 311.

When the capacitive touch screen is pressed by the conductive rubber tip 32 and the conductive rubber tip 32 is compressed in the direction toward the fixing post 31, the air within a vacant space 40 between the conductive rubber tip 32 and a top surface 313 of the fixing post 31 is discharged to the outside of the vacant space 40 through the elongated recess 311. When the capacitive touch screen is no longer pressed by the conductive rubber tip 32, the air can be quickly introduced into to the vacant space 40 through a vent 301 of the pen tube 30 and the elongated recess 311. Consequently, the conductive rubber tip 32 is restored to its original non-compressed shape. In this embodiment, the passive touch pen 3 is not equipped with the rubber tip supporting member 15 of the conventional passive touch pen 1. Consequently, the fabricating cost and the structural complexity are both reduced.

As mentioned above, the pen tube 20 of the first embodiment is made of the conductive material. Please refer to FIG. 6. In accordance with a second distinguished aspect, a front end 302 of the pen tube 30 is made of a nonconductive material, and a rear end 303 of the pen tube 30 is made of the conductive material. Moreover, the passive touch pen 3 of this embodiment further comprises the conductive plate 39. The conductive plate 39 is disposed within the pen tube 30. A first end 391 of the conductive plate 39 is contacted with the rear end 303 of the pen tube 30. A second end 392 of the conductive plate 39 is located near the fixing post 31.

Since the front end 302 of the pen tube 30 is made of the nonconductive material, when the pen tube 30 is grasped by the user and a capacitive touch screen (not shown) is pressed by the conductive rubber tip 32, the electric energy of the human body fails to be transmitted to the conductive rubber tip 32 through the pen tube 30 and the fixing post 31. In this embodiment, the passive touch pen 3 further comprises the conductive plate 39. Consequently, the electric energy of the human body is transmitted to the conductive rubber tip 32 through the rear end 303 of the pen tube 30, the conductive plate 39 and the fixing post 31. Alternatively, due to a coupling effect between the human body and the conductive plate 39, the electric energy of the human body is transmitted to the conductive rubber tip 32 through the conductive plate 39 and the fixing post 31.

Moreover, a middle region 393 of the conductive plate 39 and the conductive elastic element 37 are both connected with the circuit board 33, and the conductive spring 37 is sheathed around the fixing post 31. Consequently, the electric energy of the human body is transmitted to the conductive rubber tip 32 through the rear end 303 of the pen tube 30, the conductive plate 39, the circuit board 33, the conductive spring 37 and the fixing post 31. Alternatively, due to a coupling effect between the human body and the conductive plate 39, the electric energy of the human body is transmitted to the conductive rubber tip 32 through the conductive plate 39, the circuit board 33, the conductive spring 37 and the fixing post 31.

It is noted that numerous modifications and alterations may be made while retaining the teachings of the invention. For example, in some other embodiments, the circuit board 33, the two switch elements 34, the plastic pressing element 35, the pressure sensor 36, the conductive elastic element 37 and the wireless transmission module 38 may be omitted. Moreover, the fixing post 31 of this embodiment may be applied to the passive touch pen of the first embodiment. In addition, the fixing post 21 of the first embodiment may be applied to the passive touch pen of this embodiment.

From the above descriptions, the present invention provides a passive touch pen. The passive touch pen comprises a fixing post and a conductive rubber tip. The fixing post of the passive touch pen comprises a T-shaped venting channel, or an elongated recess is formed in a lateral surface of the fixing post. After the conductive rubber tip is compressed in the direction toward the fixing post, the air can be quickly introduced into to a vacant space between the conductive rubber tip and the fixing post through the T-shaped venting channel or the elongated recess. Consequently, the conductive rubber tip can be quickly restored to its original non-compressed shape. In accordance with the present invention, the passive touch pen is not equipped with the rubber tip supporting member 15 of the conventional passive touch pen 1. Consequently, the fabricating cost and the structural complexity are both reduced.

Moreover, the T-shaped venting channel may be applied to the fixing post with a larger-area top surface and a smaller-area bottom surface, which is in parallel with the top surface. Consequently, the volume of the fixing post is reduced, and the passive touch pen can meet the requirement of miniaturization.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A passive touch pen for a capacitive touch screen, the passive touch pen comprising:
    a pen tube comprising a vent;
    a fixing post located at a front end of the pen tube, and comprising a first perforation and a second perforation, wherein the first perforation is open to a top surface of the fixing post, and the second perforation is open to a lateral surface of the fixing post; and
    a conductive rubber tip sheathed around the fixing post and exposed outside the front end of the pen tube, wherein there is a vacant space between the conductive rubber tip and the top surface of the fixing post, wherein when the conductive rubber tip is compressed, air within the vacant space is discharged out of the vacant space, wherein when the conductive rubber tip is no longer compressed, air is introduced into to the vacant space through the vent, the second perforation and the first perforation, so that the conductive rubber tip is restored to an original non-compressed shape.

2. The passive touch pen according to claim 1, wherein the vent is formed in a lateral surface of the pen tube, and the passive touch pen further comprises:
    a circuit board disposed within the pen tube;
    a switch element disposed on the circuit board, and aligned with the vent; and
    a pressing element disposed within the vent, wherein the switch element is selectively triggered by the pressing element.

3. The passive touch pen according to claim 1, wherein the pen tube is made of a conductive material, and the fixing post is connected with the pen tube.

4. The passive touch pen according to claim 3, wherein the passive touch pen further comprises:
    a circuit board disposed within the pen tube;
    a pressure sensor connected with the circuit board and located beside the fixing post, wherein when the pressure sensor is pressed by the fixing post, a compressed force exerted on the conductive rubber tip is sensed by the pressure sensor;
    a conductive elastic element connected with the circuit board and sheathed around the fixing post, wherein the fixing post is returned to an original position by the conductive elastic element; and
    a wireless transmission module disposed on the circuit board, wherein according to the compressed force exerted on the conductive rubber tip, the wireless transmission module issues a corresponding signal to the capacitive touch screen.

5. The passive touch pen according to claim 1, wherein the front end of the pen tube is made of a conductive material, and a rear end of the pen tube is made of a nonconductive material, wherein the passive touch pen further comprises a conductive plate, wherein the conductive plate is disposed within the pen tube, a first end of the conductive plate is contacted with the rear end of the pen tube, and a second end of the conductive plate is located near the fixing post.

6. The passive touch pen according to claim 5, wherein the passive touch pen further comprises:
    a circuit board disposed within the pen tube, wherein the conductive plate is connected with the circuit board;
    a pressure sensor connected with the circuit board and located beside the fixing post, wherein when the pressure sensor is pressed by the fixing post, a compressed force exerted on the conductive rubber tip is sensed by the pressure sensor;
    a conductive elastic element connected with the circuit board and sheathed around the fixing post, wherein the fixing post is returned to an original position by the conductive elastic element; and
    a wireless transmission module disposed on the circuit board, wherein according to the compressed force exerted on the conductive rubber tip, the wireless transmission module issues a corresponding signal to the capacitive touch screen.

7. The passive touch pen according to claim 1, wherein the fixing post is made of a metallic material or a conductive plastic material.

8. A passive touch pen for a capacitive touch screen, the passive touch pen comprising:
    a pen tube comprising a vent;
    a fixing post located at a front end of the pen tube, and comprising a recess, wherein the recess is formed in a lateral surface of the fixing post; and
    a conductive rubber tip sheathed around the fixing post and exposed outside the front end of the pen tube, wherein the fixing post is sheltered by an inner surface of the conductive rubber tip, but no complementary structure matching the elongated recess is formed on the inner surface of the conductive rubber tip, wherein there is a vacant space between the conductive rubber tip and the top surface of the fixing post, wherein when the conductive rubber tip is compressed, air within the vacant space is discharged out of the vacant space, wherein when the conductive rubber tip is no longer compressed, air is introduced into to the vacant space through the vent and the recess, so that the conductive rubber tip is restored to an original non-compressed shape.

9. The passive touch pen according to claim 8, wherein the vent is formed in a lateral surface of the pen tube, and the passive touch pen further comprises:

a circuit board disposed within the pen tube;

a switch element disposed on the circuit board, and aligned with the vent; and a pressing element disposed within the vent, wherein the switch element is selectively triggered by the pressing element.

10. The passive touch pen according to claim 8, wherein the pen tube is made of a conductive material, and the fixing post is connected with the pen tube.

11. The passive touch pen according to claim 10, wherein the passive touch pen further comprises:

a circuit board disposed within the pen tube;

a pressure sensor connected with the circuit board and located beside the fixing post, wherein when the pressure sensor is pressed by the fixing post, a compressed force exerted on the conductive rubber tip is sensed by the pressure sensor;

a conductive elastic element connected with the circuit board and sheathed around the fixing post, wherein the fixing post is returned to an original position by the conductive elastic element; and a wireless transmission module disposed on the circuit board, wherein according to the compressed force exerted on the conductive rubber tip, the wireless transmission module issues a corresponding signal to the capacitive touch screen.

12. The passive touch pen according to claim 8, wherein the front end of the pen tube is made of a conductive material, and a rear end of the pen tube is made of a nonconductive material, wherein the passive touch pen further comprises a conductive plate, wherein the conductive plate is disposed within the pen tube, a first end of the conductive plate is contacted with the rear end of the pen tube, and a second end of the conductive plate is located near the fixing post.

13. The passive touch pen according to claim 12, wherein the passive touch pen further comprises:

a circuit board disposed within the pen tube, wherein the conductive plate is connected with the circuit board;

a pressure sensor connected with the circuit board and located beside the fixing post, wherein when the pressure sensor is pressed by the fixing post, a compressed force exerted on the conductive rubber tip is sensed by the pressure sensor;

a conductive elastic element connected with the circuit board and sheathed around the fixing post, wherein the fixing post is returned to an original position by the conductive elastic element; and a wireless transmission module disposed on the circuit board, wherein according to the compressed force exerted on the conductive rubber tip, the wireless transmission module issues a corresponding signal to the capacitive touch screen.

* * * * *